United States Patent [19]
Arnold

[11] Patent Number: 4,790,350
[45] Date of Patent: Dec. 13, 1988

[54] COMBAT RAPID ASSEMBLY FUEL TANK

[76] Inventor: Charles M. Arnold, 4544 Thomasville Rd., Tallahassee, Fla. 32308

[21] Appl. No.: 39,164

[22] Filed: Apr. 17, 1987

Related U.S. Application Data

[63] Continuation-in-part of Ser. No. 826,160, Feb. 4, 1986, abandoned.

[51] Int. Cl.$^4$ .................. F16K 24/00; B65D 8/00
[52] U.S. Cl. .................. 137/588; 137/590; 220/5 A; 244/135 B; 244/135 R
[58] Field of Search ............ 137/558, 588, 590; 220/5 A, 5 R; 244/135 B, 135 R

[56] References Cited

U.S. PATENT DOCUMENTS

| | | | |
|---|---|---|---|
| 2,519,393 | 8/1950 | Noyes | 244/135 B |
| 2,545,481 | 3/1951 | Maier | 220/5 A |
| 2,591,913 | 4/1952 | Bowers et al. | 244/135 R |
| 2,661,115 | 12/1953 | Fletcher | 220/5 A |
| 2,724,418 | 11/1955 | Krupp | 244/135 B |
| 2,736,522 | 2/1956 | Wilson | 244/135 R X |
| 2,756,893 | 7/1956 | Barrere | 220/5 R |
| 2,777,656 | 1/1957 | Clifton | 244/135 B |
| 2,781,935 | 2/1957 | Spieth et al. | 220/5 A |
| 2,792,192 | 5/1957 | Wheeler | 244/135 R X |
| 2,838,261 | 6/1958 | Amos et al. | 220/5 A |
| 2,863,583 | 12/1958 | Trump | 220/5 A |
| 2,876,923 | 3/1959 | McLane et al. | 220/5 A |
| 2,895,635 | 7/1959 | Pollard et al. | 220/5 A |
| 3,057,588 | 10/1962 | Kolbe | 244/135 R X |
| 3,161,384 | 12/1964 | Czerwenka | 220/5 A |
| 3,469,730 | 9/1969 | Neff et al. | 220/5 A |
| 3,679,092 | 7/1972 | Sullivan | 137/590 |
| 3,819,079 | 6/1974 | Levens | 220/5 A |
| 3,951,294 | 4/1976 | Wilson | 220/5 R |
| 4,108,328 | 8/1978 | Rage | 244/135 R X |
| 4,113,130 | 9/1978 | Lazenby et al. | 220/5 A |
| 4,203,458 | 5/1980 | Barrett et al. | 244/135 R X |
| 4,306,579 | 12/1981 | Kelly | 137/558 |
| 4,306,693 | 12/1981 | Cooper | 244/135 R |

Primary Examiner—John Rivell
Attorney, Agent, or Firm—Dowell & Dowell

[57] ABSTRACT

Rapidly assembled expendable fuel tanks which provide an auxiliary source of fuel supply for aircraft and which include flexible fuel storage bladders which are housed within sectionalized tanks or pods which are designed to be manually assembled and disassembled within minutes in the field utilizing interchangeable components designed to permit maximum efficiency in ordinance supply and material handling so that a plurality of tanks may be packaged, shipped and stored with a considerable savings in space being achieved with respect to conventional rigidly constructed expendable fuel tanks. In addition, universal mounting tank ejecting strongbacks enable a variety of tank sizes and configurations to be utilized with a variety of tactical aircraft thereby standardizing assembly and mounting procedures for the auxiliary fuel tanks used with such aircraft.

20 Claims, 8 Drawing Sheets

COMBAT RAPID ASSEMBLY FUEL TANK

CROSS REFERENCE TO RELATED APPLICATIONS

This application is a continuation-in-part application of applicant's prior application Ser. No. 06/826,160 filed Feb. 4, 1986 entitled Aircraft Expendable Auxiliary Fuel Pod System and now abandoned.

BACKGROUND OF THE INVENTION

1. Field of the Invention

This invention is generally related to auxiliary fuel tanks or pods for use with aircraft, primarily tactical or military aircraft, and particularly directed to expendable auxiliary fuel tanks or pods which are designed to be manually assembled in the field utilizing nestable and selectively assembled sections which are united or hingedly joined by continuously interlocking elements so as to enclose a flexible fuel retaining bladder therebetween. The tanks are braced by internal baffles which are cooperatively seated with the bladder. The design and multi-sectional structure of the fuel tanks enables the components for a plurality of tanks to be packaged and stored in high density configurations so that a plurality of tanks may be shipped in the same space heretobefore required for a single conventional auxiliary fuel tank. The fuel tank also provides structures which are quickly and manually assembled and aerodynamically sound without the need for numerous mechanical fasteners or complicated seals to insure tank and fuel storage integrity. The fuel tanks or pods are also provided with aircraft mounting strongbacks which are universally adaptable to permit a variety of fuel tank sizes and configurations to be readily fitted to a variety of aircraft and which strongbacks also include tank injection components thereby enabling the strongbacks to be used for a plurality of flight missions. The fuel tanks also include universally adaptable fuel exchangers and dispensing equipment.

2. History of the Prior Art

As discussed in applicant's prior application, Ser. No. 06/826,160 filed Feb. 4, 1986, now abandon, it has been an accepted practice to increase the flying range of aircraft and especially tactical jet aircraft by utilizing auxiliary fuel tanks or pods which are normally carried or mounted on the wings or fuselage tips of the aircraft. In some instances, the fuel pods are attached by means which allow the tanks to be selectively jetisoned by the pilot of the aircraft after the fuel therein has been expended.

The auxiliary fuel tanks are utilized during tactical mission operations to provide an initial fuel supply which enables an aircraft to reach a primary target area. At that point, most of the fuel in the tanks may be exhausted and the tanks readily jetisoned by the pilot. Thereafter, the aircraft is supplied with fuel from its primary fuel tanks.

Currently, the majority of expendable or external fuel tanks for military aircraft are manufactured and prepared for shipment to supply areas as individual relatively rigid units. These units are preassembled and include a welded aluminum tank which is integrally formed or attached to a strongback which connects the tank with the mounting mechanism or pylon on an aircraft. Aircraft fuel tanks are generally standardized in size and hold 150, 300, 600 or more gallons of fuel. Such tanks may be 12-15 feet in length and approximately two or more feet in diameter. As most conventional expendable auxiliary fuel pods are preassembled and shipped to the military as a unit, the size and shape of the fuel tanks not only makes the physical handling thereof more difficult but also requires a considerable amount of storage area be set aside to store tanks for subsequent use on tactical aircraft. The amount of storage space becomes a matter of particular concern when considering that such fuel tanks may be stored on aircraft carriers o in other areas such as in forward line depots wherein a limited amount of space is available.

In addition to the foregoing, conventional external or auxiliary fuel tanks for aircraft are designed and constructed in such a manner as to insure the integrity of the outer casing or shell to prevent any leakage of fuel therefrom and to also insure that the pressures both interiorly and exteriorly of the tank will not cause any failure or fatigue in the shell. As the aerodynamic stresses to which such tanks are subjected may often be considerable especially when such fuel pods are used on mach 1 and mach 2 jet aircraft, it is imperative that the overall tank structures be sound and be capable of withstanding the stresses imparted thereto during situations of power dives, climbs and turns as well as impacts from flying objects. To this end, conventional tanks are solidly constructed so as to withstand such impacts and stresses. This increases the overall cost and weight of the tanks and results in relatively rigid tank structures.

The drawbacks with respect to conventional auxiliary fuel pods or tanks for aircraft is increased when considering the expendable nature of such tanks. As one aircraft can make several mission flights during a very short period of time, it is possible that numerable tanks will be utilized by a single aircraft. Therefore, a great deal of storage area must be set aside to provide the space for storing fuel tanks for a single aircraft.

It has been proposed to construct fuel pods in sections wherein the sections may be assembled at a forward field area to thereby reduce the amount of storage space required for such tanks. In this regard, a number of patents have been directed to various configurations for auxiliary fuel tank constructions which enable the tanks to be broken down into parts for shipment and storage. Unfortunately, it has not been found practical to utilize the structures disclosed heretobefore for any of a number of reasons. In some instances, the integrity of such sectionalized fuel tanks has not permitted their use in actual field operations. In other instances, the structures have been too complex or complicated to be easily assembled in the field thereby making their use uneconomical both in cost and time.

In U.S. Pat. No. 2,545,481 to Maier, an expendable fuel tank is disclosed having upper and lower sections which are nestable so that a number of tanks can be stored within one another. One drawback of the structure disclosed is that the upper and lower sections are different in shape and structure and therefore are not interchangeable with respect to one another thereby requiring that the upper halves and the lower halves be matched for each assembly. Also, the upper and lower sections provided only a limited stacking capability as the mounting portion of the upper half of the fuel pods interfere with the components as they are stacked or nested with respect to one another.

Other examples of prior art sectionalized auxiliary expendable fuel tanks are disclosed in U.S. Pat. Nos. 2,661,115 to Fletcher and 2,863,583 to Trump. In the Trump structure, the tanks are sectionalized between their fore and aft sections having separately nestable forward sections and separately nestable aft sections. The forward and aft sections are assembled over a frame which is provided for rigidity and which is assembled prior to placing the sections of tanks in mounted relationship with respect thereto. In Fletcher, the aft sections are stored within the forward sections. Not only does the splitting of the housing into forward and aft sections create problems with additional storage space as the sections do not nest or stack uniformly so that sections must be separately stacked or housed with respect to one another but such structures require numerous complicated connectors and seals to unite the sections in tightly fitted engagement. Also, additional storage space must be provided to ship and store the frame members which constitute the central reinforcing portion of such fuel pod systems.

In an effort to improve the compact storage of forward and aft sectional fuel tanks, unique packaging components have been designed to house a plurality of fuel tanks. In U.S. Pat. No. 3,469,730 to Neff et al., a packaging structure is disclosed wherein four sectionalized tanks are nestable within a tubular carrier. Although the increased storage capacity of the structure offers advantages over prior sectionalized tanks, the structure remains overly complicated and not conducive for use in rapid assembly operations.

As mentioned above, another problem associated with previously proposed sectionalized auxiliary fuel tanks is that the integrity of the outer portion of the tanks must be sound to prevent any leakage of fuel even when stresses are imparted to the tank during flight. Therefore, special rubber or other gasketing is provided between the sections of the tanks in order to seal the same when assembled. Unfortunately, the placement of the seals is too exacting a task and very time consuming. In exact tolerances may result in limited amounts of leakage through the sealed joints and, in some instances, the aircraft fuel supply may be adversely effected by air entering the tanks through the sealed joints. Further, the cost for machined parts which must be assembled in a leak-proof manner makes the multipart construction of the aforementioned proposed prior art devices as costly as the preassembled construction currently being utilized by the military. Also such structures are not easily assembled using interchangeable components and require specialized tools and/or handling equipment.

Additional examples of prior art sectionalized expendable fuel tanks are disclosed in U.S. Pat. Nos. 2,756,893 to Barrere, 2,781,935 to Spieth et al., 2,895,635 to Pallard et al. and 4,113,130 to Lazenby et al. In the Barrere patent, the seal of the tank is provided by a pneumatic tube which is disposed between the jointed members The use of such a pneumatic seal could very easily lead to fuel leakage especially when considering the various pressures to which the tank would be exposed to during actual flight operations. U.S. Pat. No. 2,876,923, to McLane et al. discloses the use of an elastomeric sealing ring which is placed between fore and aft sections of a multi-sectioned auxiliary fuel tank. As with the prior patents discussed above, the tolerances which must be met in order to insure that there is no leakage through the sealed joints will result in a fuel tank which would be more expensive to manufacture and deliver than the preassembled units currently being used. In the remaining structures, special joints and seals for assembling and reinforcing tank sections are disclosed. Again, such structures are overly complex, not capable of rapid assembly by non-skilled personnel and are not readily stackable for compact packaging, shipment and storage.

Sectionalized fuel tanks currently in inventory consist of many form-fitting components that must be connected and secured with precision. The assembly of plumbing, gauges and baffles is an extremely complex and tedious operation. The precise alignment of bolt holes can complicate and delay assembly. After considerable time and effort is expended uncrating and assembling tanks, a significant number fail to pass required pressure and leak tests. This results in additional time and manpower being devoted in determining the source of the malfunctions and making the necessary repairs These problems in assembly cause users to elect to incur additional logistics burdens and have tanks shipped fully assembled from the manufacturer.

Also, to prepare such tanks for operational use requires a complex set of assembly instructions which often must be interpreted by relatively unskilled personnel. Another factor essential to assembly is that all required parts have been included in packaging and are not defective either from the manufacturing process or damage resulting from shipment. Present tanks are designed to be put together in periods of hours. The result, the assembly process is not time effective.

In view of the foregoing, the prior art has not fully appreciated the need to develop easily assembled sectionalized auxiliary fuel tanks for military aircraft which not only offer high density packaging and storage but also provide for safe and reliable fuel storage structures without complex seals and interlocking components. Although the prior art appreciates that some stacking of components could be possible, with the structures designed to date, only limited stacking would be possible permitting maybe four to perhaps eight units, at most, to be stacked, shipped or stored within the space required by a conventional single piece or preassembled tank. With the additional costs required for securing sectionalized tanks in assembled relationship including insuring that the joints are leakproof, prior art sectionalized fuel pods have not been adequate nor acceptable for use in the field.

Additionally, conventional external tanks are specifically designed to function as a predetermined integral unit capable of functioning properly within given flight conditions, fuel capacities and with specific aircraft. If designed for 150 gallan capacity and subsonic flight, then this becomes a tank's established profile. If the tanks have been designed for limited maneuvering and certain pressures and stresses, then these are the limiting use factors for the tanks. Once a tank is manufactured, its performance profile is set and remains inflexible for the life of the hardware. For this reason, each military service maintains a number of fuel tanks, each designed for a specific purpose and aircraft. The tanks normally range anywhere from 150-650 gallons and are structured for a variety of flight conditions. If several major components of these tanks were interchangeable, a number of tank designs would become available to a variety of aircraft in inventory. The immediate benefit would be a substantial reduction in the total number of fuel tank components that would be required to stock and maintain in inventory.

SUMMARY OF THE INVENTION

An expendable auxiliary fuel tank system for use with aircraft, and particularly military aircraft, wherein the fuel tanks are provided with a longitudinally sectionalized housings having upper and lower left and right hand sections which are assembled along continuous joints along the top and bottom and on either side of the elongated axis of the tank. The tank quarter sections are used to house a self-sealing bladder which is constructed to conform with the interior of the tank and which provides a flexible container in which the aircraft fuel will be stored within the tank. Each section of the fuel tanks are designed with a curved cross-section which enables the sections to be interchangeably nestable with one another and are joined utilizing elongated rods which extend through integrally formed hinge elements provided along the length of the edges of the sections of the fuel tanks. Separate strongbacks are provided which are engagable by two of the fuel tank sections so as to securely support the tank and reinforce the same along the uppermost portion thereof. Internally spaced reinforcing partitions or baffles are provided at spaced positions between the tank sections and are used to provide a plurality of headers within the fuel tank bladders so as to control the movement of fuel within the bladders while simultaneously reinforcing the sections of the fuel tanks. The strongbacks are designed for repeated use and include ejection components for releasing the expendable fuel tanks upon activation by the pilot of an aircraft to which the tanks are mounted. Flexible fuel dispensing systems are mounted within the flexible fuel bladders and communicate with fuel outlet valves disposed through the separate strongbacks.

It is the primary object of the present invention to provide expendable auxiliary fuel tanks or pods for use on aircraft and which are capable of being shipped and stored at sea or in field or frontline areas and manually assembled for use in such areas when necessary wherein the packaging density or capacity, based upon volume, will permit the components for up to approximately twenty or more such tanks to be stored within the space currently being required for storing a single preassembled fuel tank.

It is another object of the present invention to provide sectionalized expendable auxiliary fuel tanks for use with aircraft wherein the tanks are constructed having an internal flexible fuel retaining bladder which is protectively housed within four generally similar sections which are continuously joined along horizontally extending hinge joints with respect to the longitudinal axis of the fuel tanks and which are supported centrally and along the upper portion of two of the sections thereof by a separate strongback member into which the upper sections are keyed to thereby insure that the sections are rigidly secured and supported regardless of any stresses which may be encountered during flight.

It is another object of the present invention to provide sectionalized expendable auxiliary fuel tanks for use with aircraft wherein the tanks are constructed of four similarly shaped sections so that the sections may be stacked one within the other and wherein the remaining components of the fuel tanks may be stored adjacent to and beneath the sections of the fuel tank in a crated assembly which utilizes only a fraction of the space currently utilized for a single preassembled fuel tank of or having the same fuel capacity.

It is yet another object of the present invention to provide expendable auxiliary fuel tanks for aircraft wherein the fuel tanks are assembled in packages of component parts which are shipped to forward supply or assembly areas including forward field areas or forward shipping areas and wherein the tanks may be assembled manually by relatively unskilled personnel with the component parts of the tanks being relatively interchangeable thereby facilitating in the ease of assembly of the fuel tanks for use.

It is also an object of the present invention to provide expendable auxiliary fuel tanks for use on aircraft wherein the fuel tanks include an inner fuel retaining bladder that is protected by a sectionalized outer housing that is supported by a common strongback unit which mounts the tanks to an aircraft and wherein the strongback is universally compatible with varying sizes of tanks or shell sections and with varying types of strategic military aircraft in order to permit varying sizes of fuel tanks to be mounted to a variety of aircraft.

It is yet another purpose of the present invention to provide a structure for sectionalized expendable auxiliary fuel tanks or pods for aircraft wherein the fuel is maintained within a central flexible bladder which is housed within sections which are joined about the bladder in such a manner as to insure the integrity of the fuel bladder but without the outer sections having to be sealed in a fluid or air tight relationship with respect to one another.

It is another object of the present invention to provide auxiliary expendable fuel tanks especially for use with military aircraft wherein fuel dispensing from the auxiliary fuel tanks may be accomplished utilizing a flexible outlet and fuel monitoring system which is disposed within a resilient fuel bladder housed within a sectionalized outer shell so that the dispensing and monitoring of fuel is easily accomplished with the dispensing members being automatically adjustable by gravity under varying flight conditions.

It is yet another object of the present invention to provide auxiliary fuel tanks for use with military aircraft which may be expendable in use and which are constructed from component parts so that the tanks may be shipped and handled at much less cost than is currently possible with conventional preassembled fuel tanks and wherein the component parts may be manufactured more inexpensively thereby amounting in a great deal of economic savings as well as offering a tactical benefit in reducing the amount of material and article handling associated with such fuel tanks.

It is also an object of the present invention to provide aerodynamically designed auxiliary fuel tanks for use with aircraft which are constructed of composite materials which will permit the tanks to flex somewhat during use to thereby absorb mid-air impacts and flight stresses and wherein the tanks are designed to reduce the drag coefficient of the completed assembly to as close to zero as possible while providing a fuel tank of sufficient strength to insure that the superstructure can adequately retain the amount of fuel which is designed to be carried therein.

It is another object of the present invention to provide an auxiliary fuel tank for aircraft which utilizes a flexible inner bladder to retain the fuel supply and which bladder is housed within a multi-sectioned tank housing which is constructed of a lightweight composite material which itself is somewhat flexible so that the overall tank structure is non-rigid and somewhat yieldable to distribute stresses and forces imparted to the tank during operational use.

It is an important object of the present invention to provide an auxiliary fuel tank for use with aircraft which is designed so as to rapidly assembled in the field by relatively unskilled personnel in as little time as 15 minutes.

It is a further object of the present invention to provide a rapidly assembleable auxiliary fuel tank for aircraft which is designed having fewer component parts than prior conventional multi-sectioned fuel tanks so that the tanks may be stored, when disassembled, in very compact configurations yet may be readily assembled utilizing only a portion of the time and effort which is currently necessary for assembling multi-sectioned fuel tanks.

It is another object of the present invention to provide auxiliary fuel tanks for use with military aircraft wherein the fuel tanks are mounted to the pylons of the aircraft utilizing universally designed strongbacks which are adapted to engage tanks of varying sizes and fuel capacities so that a single strongback may be optionally used in any of a number of aircraft to support any of a number of auxiliary fuel tanks as desired.

It is a further object of the present invention to provide auxiliary fuel tanks for use with aircraft wherein the strongback which mounts the tanks to the aircraft pylon is designed to permit ejection of the fuel tanks upon command by the pilot of the aircraft and wherein the strongback remains supported by the pylon for future use.

DESCRIPTION OF THE PREFERRED EMBODIMENT

Figures 1, 2:
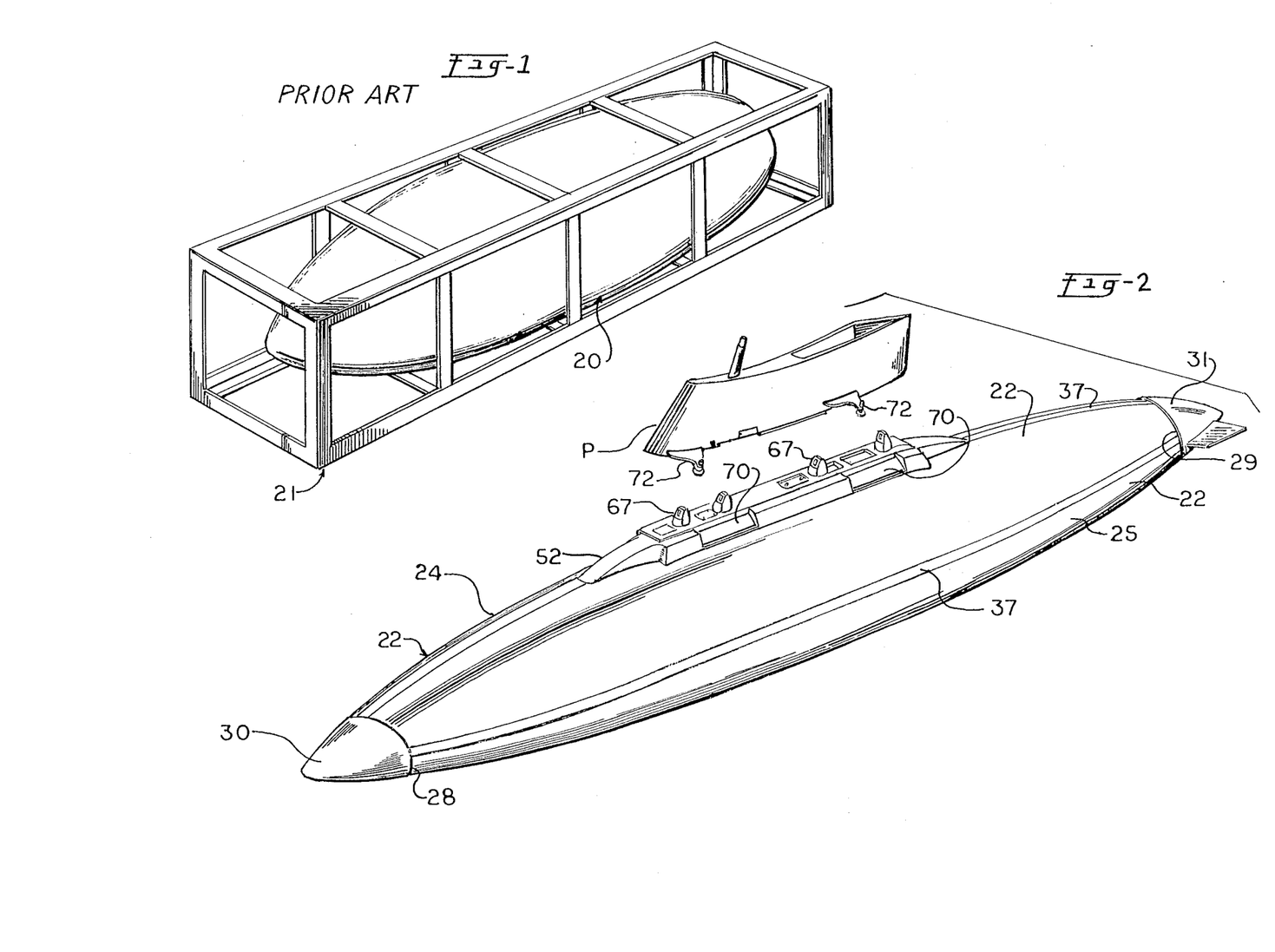
FIG. 1 is a perspective view of the auxiliary expendable fuel tank which is preassembled and crated for shipment and/or storage.
FIG. 2 is a perspective view of the expendable auxiliary fuel tank of the present invention showing the tank being disassembled from the pylon of an aircraft.

With continued reference to the drawings, a conventional preassembled expendable fuel tank 20 is shown as it is crated in a crate 21 and ready for shipment to a forward service or mission area or for storage in an appropriate supply depot. By way of example, the preassembled conventional auxiliary fuel tank is generally constructed of welded aluminum and may have a width dimension of up to approximately three feet, a height dimension of approximately two feet and be of a length of up to 12–15 feet. From the foregoing, it can be observed that a single preassembled fuel tank utilizes a considerable amount of storage or packaging space limits the number of preassembled tanks that can be stored either within a given supply area or shipped at one time to forward mission areas at sea or in the field.

As previously discussed, one of the primary considerations of the present invention is to provide high density packaging of sectionalized expendable auxiliary fuel tanks so as to enable a plurality of tanks to be shipped and stored in the same space and volume that is normally consumed by the shipment of a single preassembled conventional fuel tank. For purposes of illustration, it should be assumed for the remainder of the application that the sectionalized auxiliary fuel tanks of the present invention are of the same size when assembled as the conventional fuel tank illustrated in FIG. 1. This consideration is of particular importance as it is possible to ship and store as many as twenty or more of the sectionalized auxiliary fuel tanks of the present invention in the same storage space as that shown in FIG. 1. This high density packing offers significant advantages in not only permitting more fuel tanks to be stored in a much reduced storage area but also significantly reduces the amount of material and article handling which must be done in order to effectively ship and store the fuel tanks for use in a given mission area. The high density packaging offers additional benefits considering the limited amount of storage space aboard shipboard or in remote field areas. In addition to the benefits of high density storage, the cost benefits of the reduced material and article handling will be significant.

Figure 3:
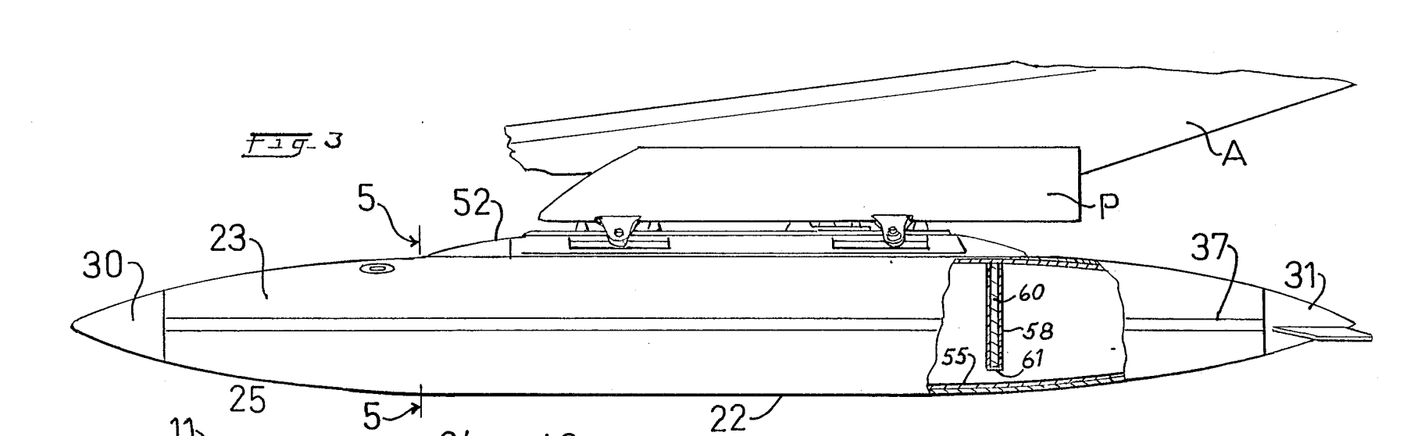
FIG. 3 is a left side view of the fuel tank of FIG. 2 having portions broken away showing the cross section of an interior baffle and showing the tank as mounted to the pylon of an aircraft.
Figure 4:
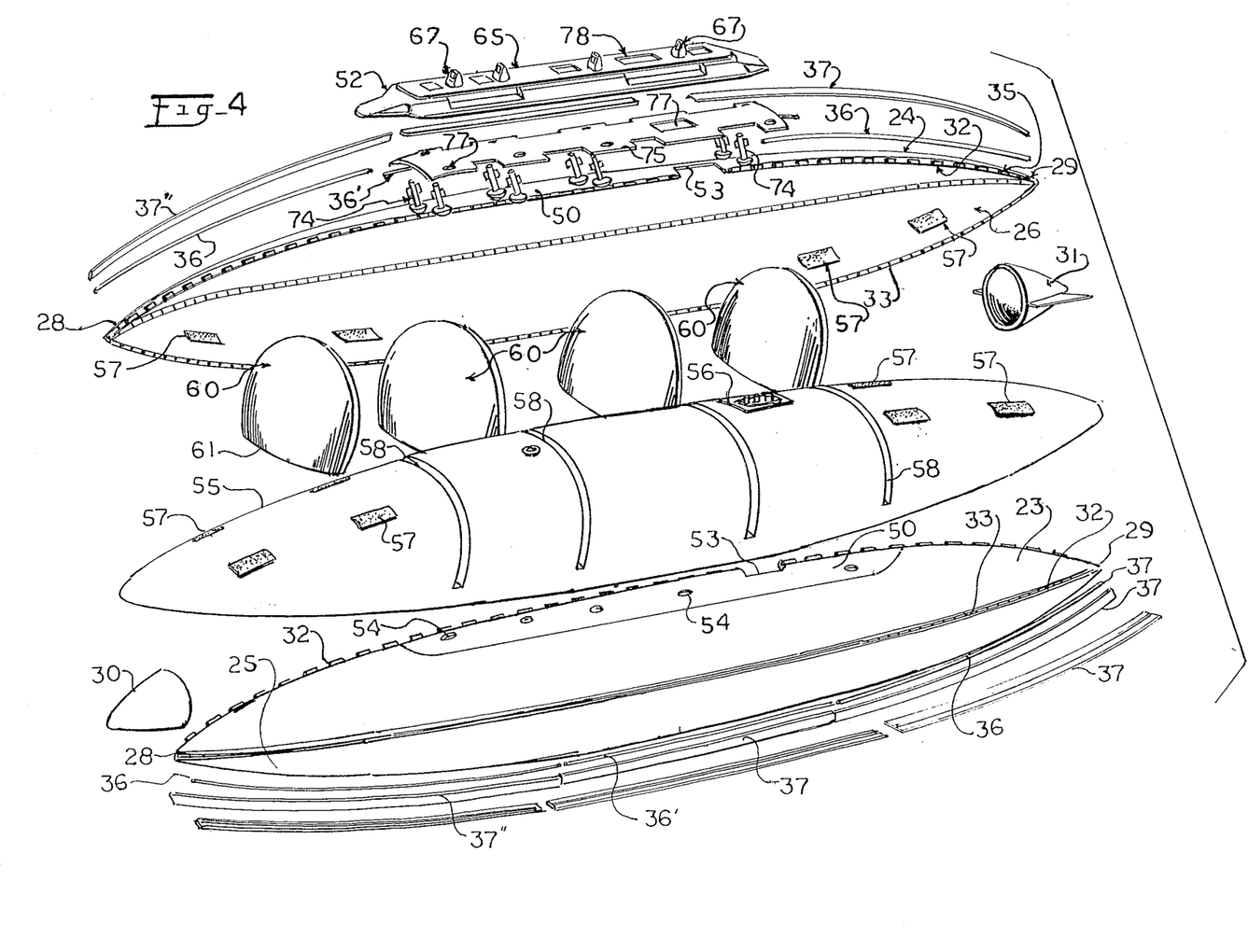
FIG. 4 is a perspective assembly view of the auxiliary fuel tank of the present invention.

With particular reference to FIGS. 2-4 of the drawings, the sectionalized auxiliary fuel tank of the present invention includes a housing 22 which is shown as being constructed of upper and lower left and right hand quarter sections 23, 24, 25 and 26, respectively. Each of the sections of the housing includes a forward section 28 and an aft portion 29 which are covered when assembled by a nose cone 30 and tail assembly 31. The nose cone 30 and tail assembly 31 are generally continuously formed in generally conical configuration and are interfitted and secured by appropriate fastening means or adhesives over the forward and aft portions of the tank when the sections thereof are brought into assembled relationship with respect to one another.

Each of the longitudinally extending quarter sections 23-26 of the auxiliary fuel tank housing 22 are generally similarly constructed so as to be cooperatively nestable one within the other and are stackable in any random order. To this end, the cross sectional dimensions of each of the sections is generally the same throughout the length thereof. Each of the housing sections includes upper and lower edges 32 and 33 which are defined having a plurality of integrally formed and equally spaced open hinge joints 35 generally equally spaced along the full length of the edges from the forward to the aft portion of each tank section. In order to allow the sections to be interengaged with one another, the hinge joints are staggered so that the opposing hinge joints along a common joint are spaced in alternate relationship with respect to one another so that the hinge joints 35 carried by the upper edge 32 of the housing section 24 are intermittently spaced and generally aligned with the hinge joints 35 provided along the opposing edge 32 of the upper left hand tank section 23. Each of the hinge joints includes a central opening therethrough so that when assembled, the hinge joints provide an elongated open passageway along each of the joints between the housing sections through which one or more elongated connecting rods 36, 36' and 36" are selectively inserted. In this manner, the connecting rods and hinge joints provide a continuous interlock between adjacent tank sections. In FIG. 4, three connecting rods 36, 36' and 36" are shown as being extended along a common intersection or joint between the sections of the tank housing. It is envisioned that one or two longitudinally extending rods or perhaps four or more rods could be utilized along each joint depending upon the size and exact shape of the tank.

Under normal operating conditions, it is preferred that the upper and lower left hand tank sections 23 and 25 and the upper and lower right hand tank sections 24 and 26 will be hingedly connected with respect to one another prior to being crated for shipment. In the event the shape of the tank is such as to have sloping forward and aft portions, as is disclosed in FIG. 4 of the drawings, the single intermediate connecting rod 36' would be inserted between the sections to retain them in pivotable relationship with respect to one another in the container. When being assembled, these sections will already be retained in alignment thereby decreasing the amount of assembly time in the field. In addition, the pivotal movement of the opposing sections will permit personnel to manipulate the remaining components of the fuel tanks of the present invention and thereafter pivot the sections into aligned relationship with respect to one another after which the hinge joints may be selectively connected by the remaining connecting rods 36-36".

Figure 7:
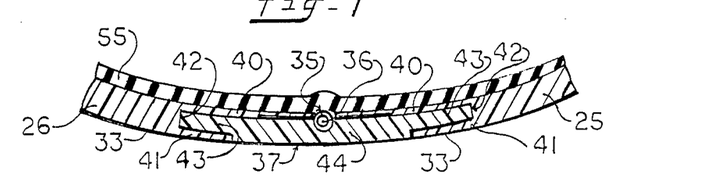
FIG. 7 is an enlarged partial cross sectional view of the hinged joint between the sections of the auxiliary fuel tank of the present invention.
Figure 10:
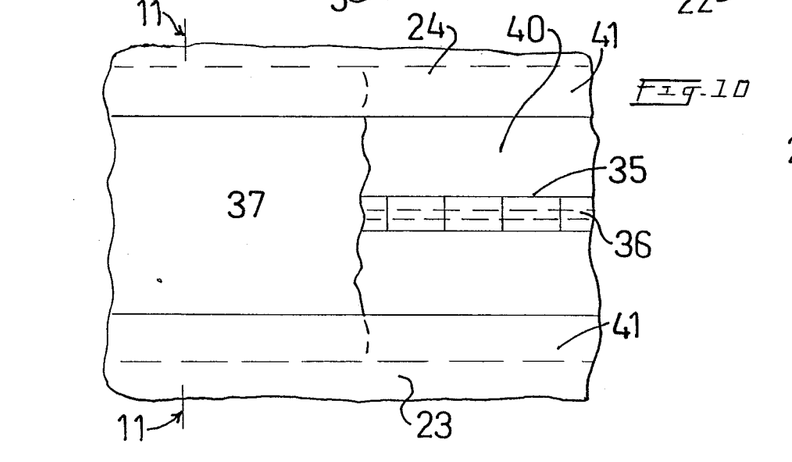
FIG. 10 is an enlarged sectional view of a covered hinge joint of the present invention.
Figure 11:
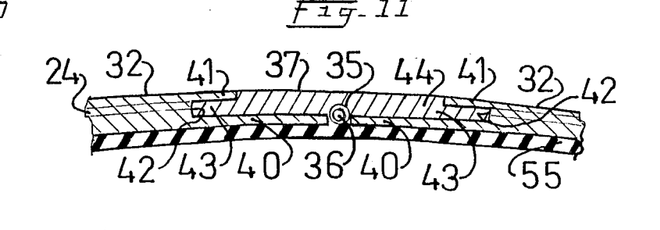
FIG. 11 is a partial cross sectional view taken along lines 11—11 of FIG. 10.

In order to reduce any adverse effects that the hinged engagement of the housing sections may have with respect to the aerodynamics of the fuel tank of the present invention, separate fairing strips are provided which are selectively received in locking engagement along the edges 32 and 33 of the joined housing sections. The fairing strips are shown in assembly view at 37, 37' and 37" in FIG. 4. With particular reference to FIGS. 7, 10 and 11, the edge structures of each of the housing sections is shown in greater detail together with the respective placement of the connecting rods 36 and the fairing strips 37. As shown, each of the edges includes an outwardly extending elongated and substantially continuous inner flange 40 having the hinge joints 35 formed integrally with the outer ends thereof. The edges further include outermost flanges 41 which extend along substantially the entire length of each section but which are spaced inwardly or away from the hinge joint 35. An open recess 42 is provided between the flanges 40 and 41 for purposes of selectively receiving and locking the fairing strips 37 in place. During assembly, after the edges have been aligned and the locking rods inserted through the alternating hinge joints 35, the fairing strips 37 are slidingly engaged in the inverted T-shaped channel formed between the opposing edge channels 42 and the respective flanges 40 and 41 as shown in FIGS. 7 and 11. The fairing strips include outer extending flange portions 43 which are selectively slideably received within the channels 42 and a central body portion 44 which is of a size to insure that the fairing strip is flush with the exterior surface of each of the housing sections when the tank is fully assembled as is shown in the drawings. Also, although plural strips are shown along each joint, a single elongated strip could be used.

Although the housing sections of the auxiliary fuel tank of the present invention are generally similarly constructed, the uppermost sections are each provided with a slightly modified upper central portion 50 which provides a supporting surface for a strongback 52 which is utilized to mount the assembled housing to the pylon P of an aircraft A. In addition, the upper housing sections 23 and 24 include a notched portion 53 along the opposing upper edges 32 thereof for purposes of permitting the valves of a fuel dispensing system to be extended therethrough as will be described in greater detail hereinafter and also include a plurality of locking and/or ejection pin receiving openings 54.

The housing 22 of the expendable fuel tank of the present invention is designed to securely support an internal self-sealing fuel bladder 55 which has an overall shape which is complementary to the shape of the housing 22. The fuel bladder 55 is completely sealed with the exception of an opening through which the fuel dispensing system is extended as will be described in greater detail hereinafter and also with respect to an emergency discharge opening (not shown) and a fuel inlet opening. The fuel inlet opening is generally shown at 56 in FIG. 4. The fuel bladder 55 is designed to be cooperatively seated between the housing sections. In order to secure the bladder in place within the housing 22, a plurality of interlocking fabric strips 57 are provided along the length and the circumference of the fuel bladder. These interlocking fabric strips, which may take the form of VELCRO fastening material, interengage with corresponding locking strips or VELCRO material 57 which are adhesively secured to the interior surface of each of the housing sections 23-26. In this fashion, when the bladder is placed within the housing sections, the VELCRO or other material interlocking strips will secure the bladder in a proper position with respect to the housing and prevent any shifting of the bladder with respect thereto.

The bladder is further provided with a plurality of generally parallel, spaced and inwardly extending wall portions 58 which define elongated recesses for receiving a plurality of baffle members 60 which are insertable therein. The baffle members 60 are generally constructed of a lightweight composite material and are of a shape to conform to the upper and side wall portions of the housing defined by the four housing sections. In this fashion, a plurality of partitions are created along the length of the fuel bladder to thereby prevent the splashing or excessive movement of fuel back and forth from end to end of the bladder during flight. Each of the baffles 60 has a generally straight lower wall portion 61 which extends across the inner surface of the bladder at a point spaced from the bottom thereof. As shown in FIG. 3, as the baffles 60 extend in spaced relationship with respect to the bottom of the housing 22 and the lower wall of the fuel bladder, fuel may flow beneath each of the baffles toward the central portion of the fuel tank where the fuel will be extracted by appropriate fuel supply lines as will be discussed in greater detail hereinafter. From the foregoing, the baffles 60 provide both a stabilization of the housing sections by providing transverse bracing with respect thereto and also provide partitions for controlling the movement of fuel within the fuel bladder during periods of flight. The fuel bladder, on the other hand, provides the support for the baffles thereby negating the requirement for additional mechanical fasteners to be provided to brace the interior portion of the fuel tank.

Once the fuel retaining bladder has been positioned within the housing 22, the fuel tank is ready to be attached to the strongback 52 by way of which the tank will be suspended from the pylon P of an aircraft. The strongbacks 52 of the present invention are uniquely designed so as to be universally adaptable to a plurality of sizes of fuel tanks or fuel tank housings. Therefore, regardless of the size or specific shape of the fuel tanks which are formed in accordance with the present invention, such tanks are designed having similarly aligned openings 54 through the central portion 50 of each of the sections 23 and 24 so that appropriate mounting connectors may be inserted therethrough to secure the tanks to the strongback.

Figure 5:
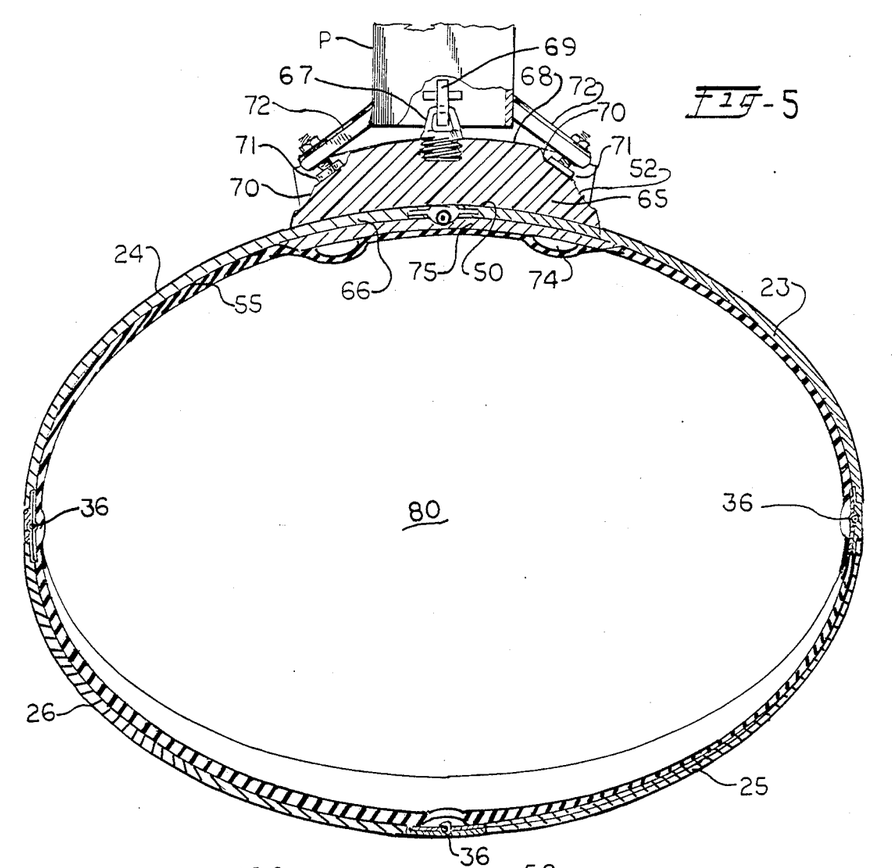
FIG. 5 is an enlarged cross sectional view taken along lines 5—5 of FIG. 3.

The strongback 52 includes an elongated body portion 65 having a lower slightly concave surface 66 which is engageable with the area 50 on the central portion of the upper sections 23 and 24 of the tank housing 22. A plurality of spaced pylon mounting lugs 67 extend upwardly from the upper surface 68 of the strongback and are engageable by mounting hooks 69 carried by the pylon assembly mounted to the aircraft. The strongback includes pairs of recessed side wall portions 70 in which are selectively received the foot portions 71 of the sway braces 72 which are also carried by the pylon attached to the aircraft. The foot assembly portions 71 of the sway braces may be selectively adjustable in order to properly orient the strongback in proper position for supporting the fuel tank relative to the pylon as shown in FIG. 5. The strongback is selectively secured to the auxiliary fuel tank housing 22 by means of a plurality of connecting pins 74 which extend through openings in each side of the strongback which are aligned with the openings 54 in the surface portion 50 of each of the upper housing sections 23 and 24.

Mounted intermediate the fuel bladder and the tank housing sections 23 and 24 is an intermediate brace plate 75 which also has a plurality of openings 76 therein which are in alignment with the openings in the strongback and the tank housing so as to permit the locking pins to be extended therethrough. The auxiliary brace plate is provided for purposes of reinforcing the fuel tank in the area of the interface with the strongback. The auxiliary plate includes a supplemental opening 77 through which the fuel supply assembly of the present invention will be extended as will be described in greater detail hereinafter. The opening 77 is aligned with a similar opening 78 through the strongback also for purposes of providing clearance for the fuel supply assembly.

As previously discussed, the strongback of the present invention not only allows universality and adaptability between tanks of the present invention but the strongback is also provided to permit ejection of the auxiliary tanks as desired by the aircraft pilot. To this end, the strongback is provided with internal cavities in which the ejection system 79 of the present invention is selectively mounted. The ejection system is normally housed between the base of the strongback and removable strongback cover portions 81 which are selectively secured to the base portion utilizing threaded locking pins or cover fasteners 82.

Figure 13:
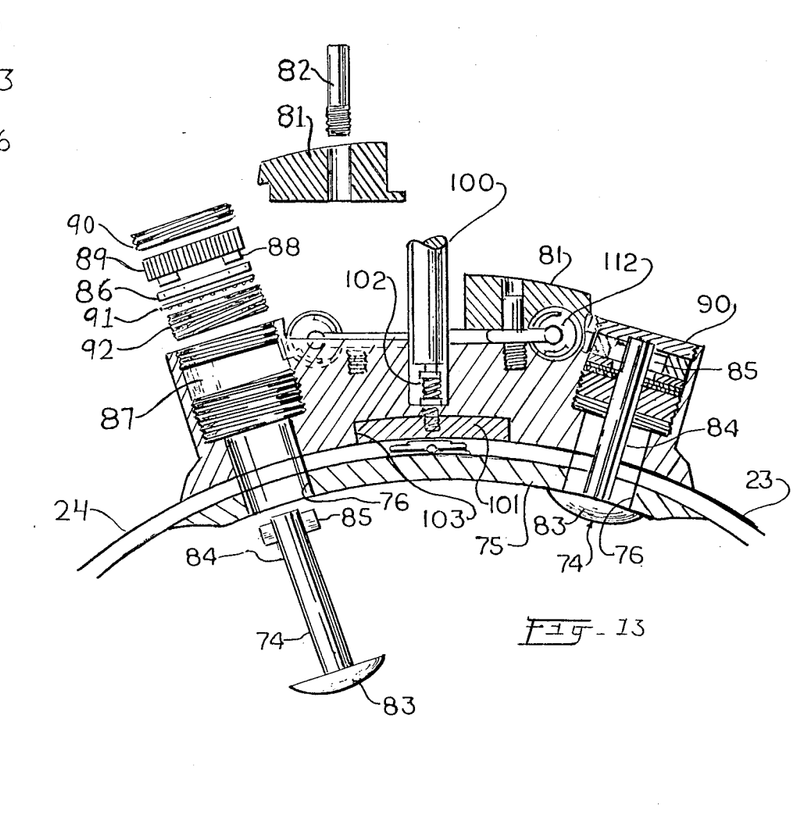
FIG. 13 is a partial cross sectional assembly view taken through the strongback and fuel tank showing one of the strongback locking pin retention assemblies and a portion of the ejection controls of the present invention.
Figure 14:
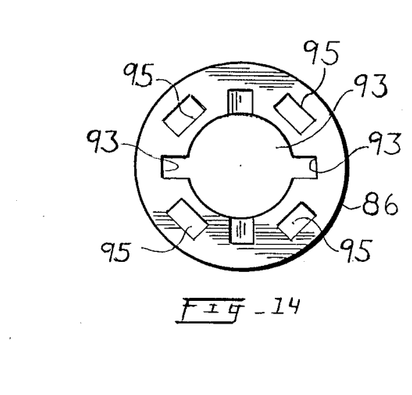
FIG. 14 is a top plan view of a locking pin support ring.

The locking pins 74 include an enlarged head portion 83 which is a size to extend outwardly from each of the openings 76 in the brace plate 75 so as to prevent the passage of the pin outwardly of the plate when retained by the strongback. The locking pins further include an elongated shank 84 having an outwardly extending key portion 85 which is selectively receivable and supported by an adjustable support ring 86 which is rotatably carried within elongated openings 87 in the strongback. The support ring 86 is engaged by depending flange elements 88 carried by gear element 89 both of which are also mounted within the opening 87. The upper portion of the opening is closed by a threaded cover member 90. The support ring 86 is supported on a bearing element 91 which is mounted on a base member 92 threadingly secured within the lower portion of the opening 87. The support ring 86 includes a generally central opening 93 through which the shank portion 84 of the locking pin is selectively movable. In order to provide clearance for the key 85 of the locking pin, the support ring is provided with a pair of opposing slots 93 which permit the passage of the key elements when the keys are rotated in alignment therewith.

From the foregoing, when the locking pins are inserted upwardly through the brace plate and the upper tank housing sections and into the opening 87 in the strongback, the locking pins are rotated until the key elements 85 are seated upon the upper surface of the support ring 86. In this position, the locking pins are secured to the strongback and locked in place by the key elements 85 with the locking pins being prevented from withdrawal by the engagement of the key elements 85 with the support ring. Upon manipulation of the gear elements 89, the flange elements 88 which depend therefrom and which are seated in the recesses 95 in the support ring, will cause the rings to rotate relative to the locking pins until a point where the channels 93 come into alignment with the key elements 85. At this position, the elements 85 allow the locking pins to be withdrawn from the openings 87 thereby disengaging the tank housing relative to the strongback.

Figure 6:
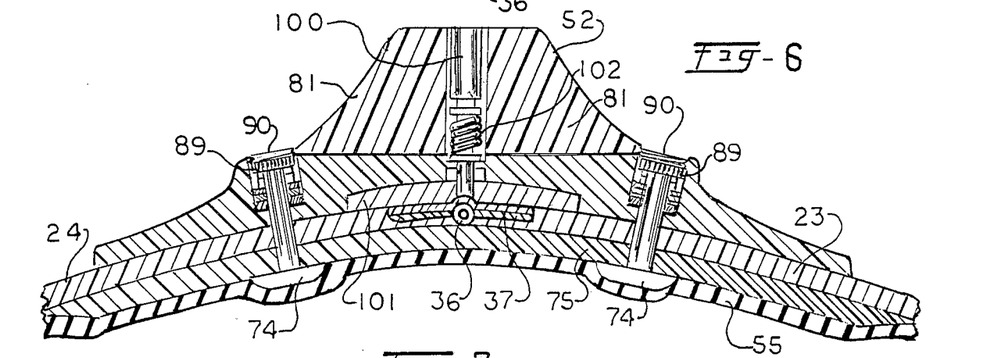
FIG. 6 is an enlarged partial cross sectional view taken through lines 6—6 of FIG. 2 and showing the ejector pins and jetison cylinder arrangement between the strongback and the auxiliary fuel tank of the present invention.

The operation of the gearing elements 89 is controlled by air pressure provided from the pylons pneumatic ejection system. Once the locking pins have been aligned so as to be withdrawable from the strongback, the ejection system operates on a piston element 100 which is mounted centrally of the strongback and forces the piston element into engagement with an ejector plate 101 which is mounted to the base portion of the piston. The ejection plate 101 engages the upper surface of the tank and is utilized to distribute the force exerted by the piston element equally across portions of the upper surface of the tank adjacent the strongback. The piston 100 is provided with a return string 102 which will realign the piston within the strongback and withdraw the ejection plate 101 into a cradled position within recessed opening 103 along the lower surface of the strongback so that the piston is realigned for future use.

The piston is provided with a driving source created by high pressure air which is conveyed through a conduit 105 which extends upwardly to a second conduit 106 to a pneumatic junction box 107. Air pressure is applied to the junction box 107 by a high pressure inlet line 108 which is connected to a conventional source of high pressure air not shown.

The high pressure air from the junction box 107 is also utilized to operate the movement of the gear elements 89 to release the locking pins 74. With specific reference to FIG. 9, a detailed drawing of the ejector release mechanism for the locking pins is shown in greater detail. Air is conducted from the junction box by a pair of high pressure outlet lines 150 and 151 which extend to one end of a pair of pneumatic cylinders 152 and 153 in which are mounted control rods 154 and 155. The control rods are provided with a plurality of spaced and generally longitudinally extending gear teeth 156 which are meshed with the gear element 89 of each locking pin assembly. When high pressure air is introduced into the cylinders 152 and 153, the ends of the control rods are forced outwardly of the cylinders thereby driving the control rods 154 and 155 away from the cylinders and causing the gear elements, 6 to rotate the locking pin assembly gears 89. The relationship between the control rods 154, 155 and the gear elements 89 is such that upon activation, the control rods will rotate the gear element and subsequently the support rings 86 through approximately 90° to align the channels in the support rings with the key elements in the locking pin to thereby permit the withdrawal of the locking pins from the strongback.

Figure 9:
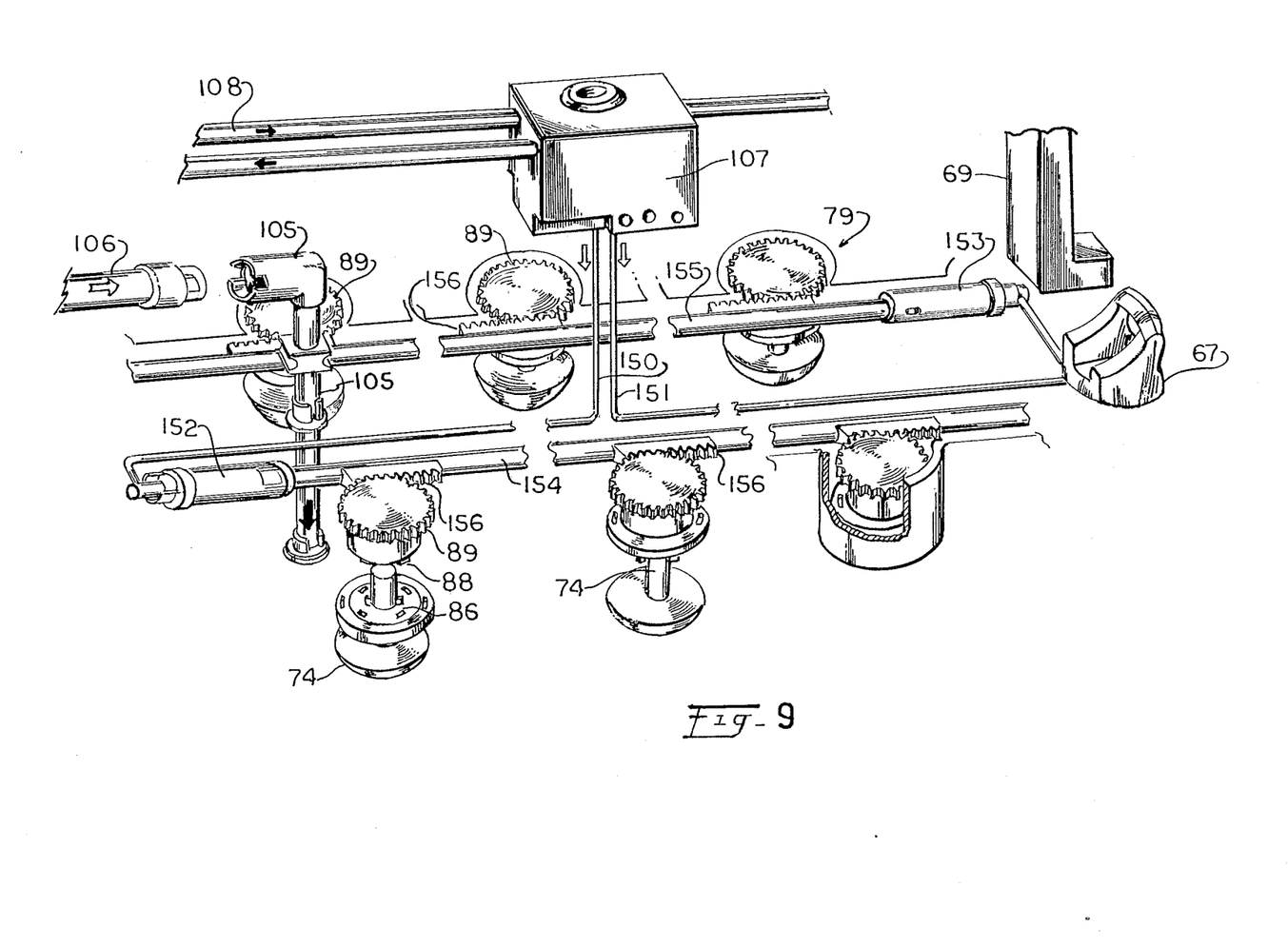
FIG. 9 is an enlarged illustrational view of the ejection system which is carried by the strongback of the present invention.

In view of the foregoing, the activation of the gear elements 89 to rotate the support ring 86 is accomplished generally simultaneously with the activation of the ejection piston 100. In this manner, as soon as the locking pins are aligned for releasable movement from the openings 87, the ejection piston will be activated to force the fuel tank from engagement with the aircraft pylon.

Figure 8:
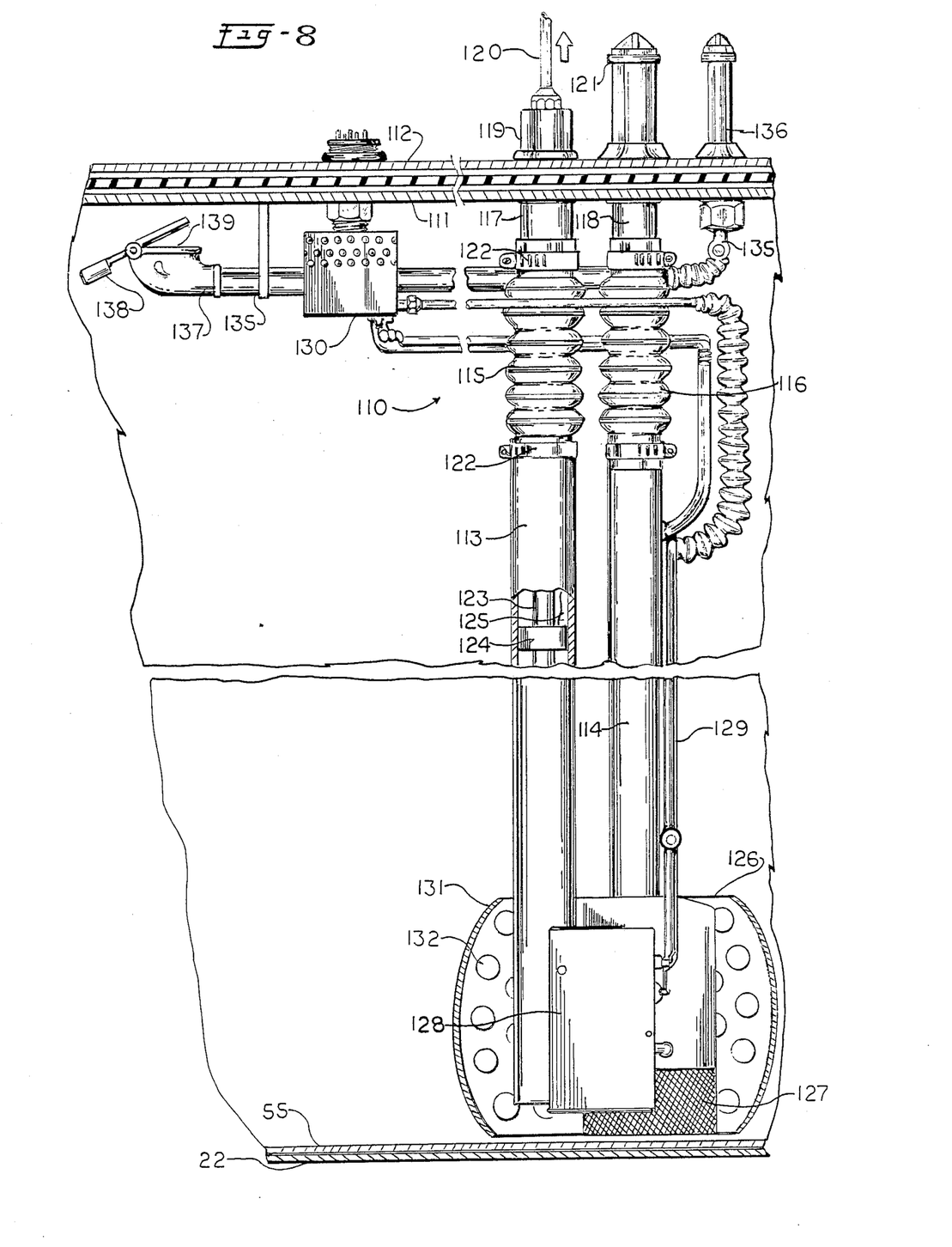
FIG. 8 is a partial cross sectional view showing the relationship between the strongback of the preset invention and the fuel supply system which is disposed within the bladder of the auxiliary fuel tank.

As previously discussed, the fuel bladder, the brace plate and the strongback have generally enlarged aligned openings therein through which the fuel and pressure lines which regulate the flow of fuel from the bladder are extended. With particular reference to FIG. 8 of the drawings, the fuel exchanger of the present invention will be disclosed in greater detail. The fuel exchanger 110 is mounted within the bladder and supported by a mounting plate 111 which is securely engaged in airtight relationship with the edges defining the opening in the bladder. Once the bladder has been placed within the tank sections, an upper support plate 112 is inserted over the upper portion of the fuel exchanger and supports the same with respect to the surface of the tank sections. The fuel exchanger 110 includes a pair of generally parallel pipes or tubes 113 and 114 which are connected by way of flexible corrugated tubing portions 115 and 116, respectively, to nipples 117 and 118 which pass through the mounting plates 111 and 112. Nipple 117 is connected to an external fuel gauge element 119 and an electrical line 120 extends therefrom to the cockpit of the aircraft. Nipple 118 is connected to a quick disconnect fuel fitting 121 through which fuel is conveyed to the aircraft from the flexible bladder.

The corrugated or flexible pipe sections 115 and 116 are secured by clamping rings 122 to each of the respective pipes and nipples as shown in the drawings. The flexible portions 115 and 116 permit the lower portions of the tubes 13 and 114 to pivot or swing within the interior of the fuel bladder of the auxiliary fuel tanks when an aircraft is in flight thereby allowing the lower ends of each of the tubes to be adjustable by gravity. Tube 113 includes a general solid central rod-like core member 123 which extends substantially along the entire length thereof. A float 124 is disposed about the rod 123 and is movable with respect thereto depending upon the amount of fuel contained within the fuel bladder. Electrical resistance wires 125 are connected between the floatable ring 124 and instrumentation (not shown) which is on board the aircraft so that the fuel level within the bladder will be accurately reflected to the pilot.

The fuel discharge tube 114 includes an intake portion 126 having an inlet filter cover 127 attached thereto. A solenoid operated pilot valve 128 is mounted adjacent the inlet portion of the discharge tube and is supplied with electrical current through electrical wires 129 which extend upwardly to an electrical interconnect assembly 130 which extends through the mounting plates 111 and 112. The lower ends of each of the tubes 113 and 114 are joined in assembled relationship and covered by a housing 131 which is connected to the tubes by connectors not shown. The housing not only provides weight to the base of each of the tubes to facilitate their movement by gravity within the bladder but the housing also maintains the bladder in spaced relationship from the lower ends of the tubes. The housing is provided with a plurality of openings 132 through which fuel may pass. The housing will maintain the bladder spaced from the inlet portion of the tubes even if the tube begins to collapse relative thereto.

In order to insure that sufficient dispensing pressure exists within the bladder, the fuel bladder is also equipped with an air pressure inlet line 135 which extends from an air valve fitting 136 disposed through the mounting plates 111 and 112 to a float valve assembly 137 which is closeable upon the introduction of fuel to a level which will operate float 138 to close the air inlet 139 into the bladder. From the foregoing, the fuel exchanger of the present invention not only allows the fuel discharge lines into the aircraft to be movable by gravity within the bladder, but the system provides a safe and convenient indication of fuel level and regulates the air pressure within the tank to insure operating safety under various flight conditions.

The auxiliary fuel tanks are generally designed to deliver sufficient fuel to the aircraft to reach the target area and thereafter the tanks may be selectively jetisoned from the aircraft to permit the aircraft to maneuver for tactical operations. As the aircraft will normally be in substantially level flight when utilizing the auxiliary fuel tanks, it is not necessary for the fuel intake lines 114 to flex a great deal within the bladder in order to insure that substantially all the fuel is received therefrom. The discharge tube should, however, be able to move through an arc of at least several inches to a foot in order to provide for aircraft banking, climbing and diving at times when the fuel tank bladder is relatively empty. An advantage of the present invention is that is generally not necessary to continuously pressurize the interior of the fuel bladders as the bladders will tend to collapse to a limited degree as fuel is removed therefrom thereby assisting in the discharge of fuel. However, the pressure lines 136 and a pressure relief line, not shown, are provided to insure that sufficient pressure is available at all times and to prevent any excess pressures that may develop.

Figure 12:
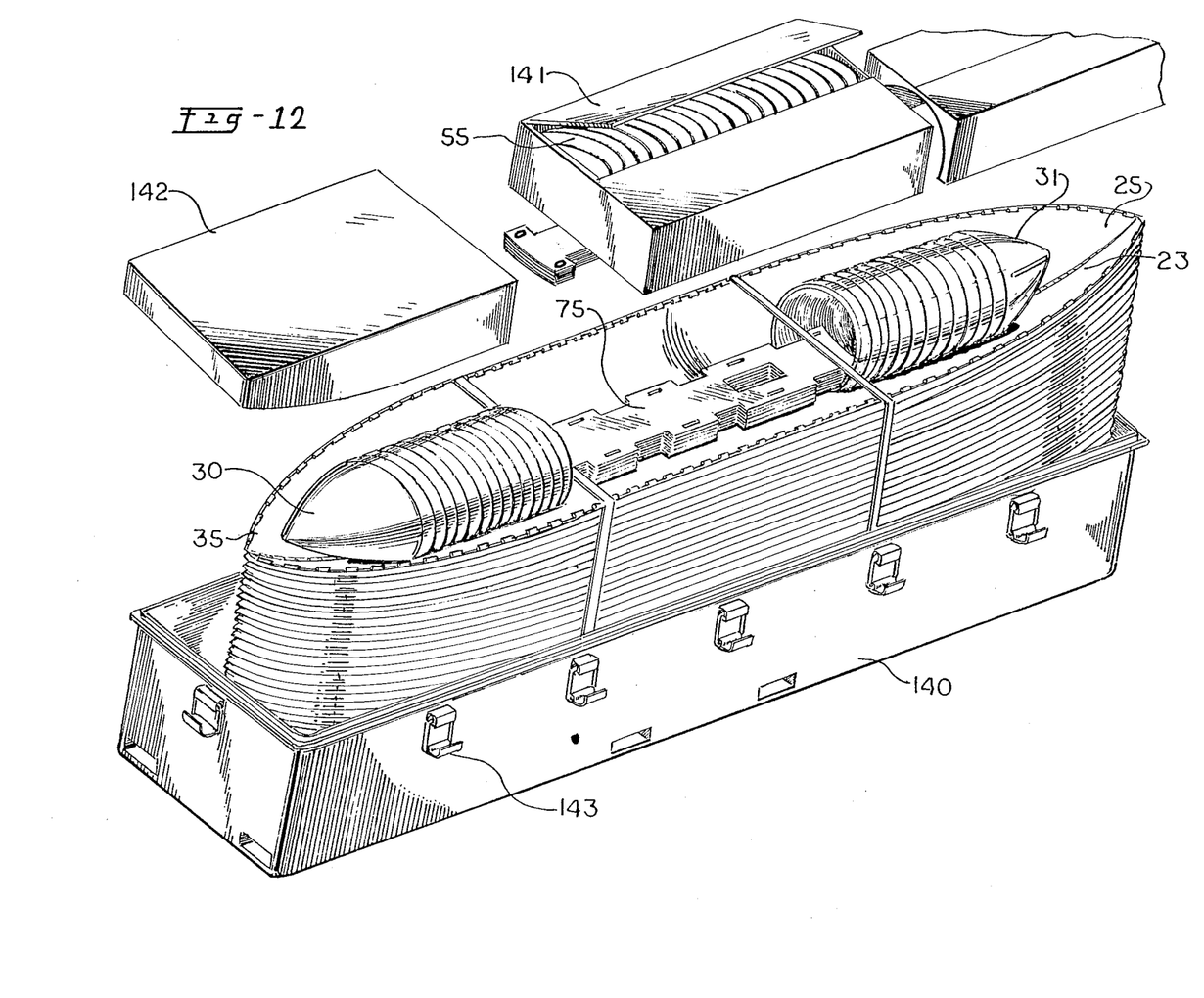
FIG. 12 is a perspective illustrational view showing the components of a plurality of tanks being disassembled for crating in a shipment and storage container.

As a primary purpose of the development of the auxiliary fuel tanks of the present invention is to provide for high density packaging and shipping of materials to a forward sector, components of the invention have been designed to be densely packaged as shown specifically in FIG. 12 of the drawings. As shown in FIG. 12, the components for approximately 20 completed fuel tanks may be stored in a crate substantially the size or dimensions as the crate discussed above with respect to the preassembled conventional fuel tank shown in FIG. 1.

As shown in FIG. 12, the left side tank sections 23 and 25 are shown as being stacked in assembled relationship intermittently with the right hand sections 24 and 26. As previously discussed, it is generally preferred to at least connect portions of each of the right and left hand tank sections with the connecting rods 36 prior to packaging the units for shipment. In this regard, half sections of the tank are seated one within the other within the crate 140. After the tank sections have been securely bundled, the nose cone and tail cone portions are placed within the upper concave portions of the stack of shell sections. The auxiliary strongback mounting plates 75 are thereafter stacked between the nose and tail cone portions. The fuel bladders are prefolded and crated in a box 141 which is mounted on top of the central portion of the crated unit with a separate crate 142 being provided for the strongback mounting pins 74. The connecting rods 36 and the fairing strips 37 are placed around the outer edges of the tank sections, and thereafter, a mating cover portion for the crate 140 is placed over the packaged materials and locked into secure engagement therewith using locking clips or clamp members 143. The secured crate 140 may thereafter be handled and shipped by appropriate means to areas of storage or to forward areas for use as necessary.

As the strongbacks of the present invention are universally adapted to engage various sizes of tanks, the strongbacks are generally separately packaged for shipment.

As previously discussed, it is preferred that the auxiliary fuel tanks of the present invention be constructed of a material which would allow some deflection of the tanks during flight. To this end, it is believed that the use of a composite material other than an aluminum material may be preferred for constructing the tank sections. By way of example, the modular or segmented tank sections are preferrably prefabricated using composite materials of carbon fiber roving, triaxial glass fabric and glass cloth impregnated with a room temperature curing resin. This E-glass composite of glass and carbon impregnated resin offers many advantages as a composite construction material. It is extremely strong yet offers a certain degree of flexibility depending upon the percentage of carbon used. Additionally, it is an extremely lightweight material, accepts coloration easily, and is one of the more inexpensive composites. Production speeds may be greatly increased using E-glass and the manufacture of parts with no defects is highly reliable. Also, by way of example, the strongbacks of the present invention may be constructed of a composite material. Such material may include a graphite-hybrid composite including plies of glass and carbon. The addition of carbon provides a rigid, fatigue-resistant structure having increased flexural strength. The total weight of the strongback including fasteners could be under 25 pounds.

In addition to the foregoing, the fuel bladder of the present invention may be constructed of various materials which are not effected by the fuel contained therein and which are pliable and strong enough to insure that the fuel will not leak therefrom during operational conditions. Several types of bladder material which are believed to be acceptable for use include VITHANE, BTC-86. VITHANE is a product of Goodyear and is a polyurethane rubber material. A possible bladder configuration would consist of a seamless and continuous underliner, a fuel barrier, a ply of nylon fabric and a seamless and continuous VITHANE outer ply thereby creating a 4-ply bladder which is extremely strong and lightweight.

As an alternative, the liner may consist of a 3-ply buildup of materials including an inner liner, a central thermosetting adhesive material and an outer ply utilizing a nitrile material.

I claim:

1. An expendable fuel tank for mounting to the plyon of an aircraft comprising, a housing having separate longitudinal sections, each of said sections having forward and aft ends, generally convex outer surfaces and generally concave inner surfaces and opposite edges, said sections being shaped so as to be nestable one within another when disassembled, a generally flexible fuel retaining bladder cooperatively received between said sections of said housing, said bladder having upper and lower portions and being substantially impervious to fluid but having an opening through an upper portion thereof, strongback means, first connector means for connecting said housing to said strongback means, a first opening in said housing which is in alignment with said opening in said bladder, fuel dispensing means disposed within said bladder and mounted within said opening therein, and second connector means for joining said opposite edges of said sections in assembled relationship with respect to one another so that said housing supports said bladder therein.

2. The expendable fuel tank of claim 1 including a plurality of baffle members positioned within said housing, said baffle members having opposite end portions which engage said generally concave inner surfaces of said sections of said housing and means for supporting said baffle members relative to said sections of said housing.

3. The expendable fuel tank of claim 2 in which said bladder includes a plurality of generally parallel recessed portions extending from the upper toward the lower portions thereof, said baffle members being positioned within said recesses in said bladder.

4. The expendable fuel tank of claim 1 in which said housing includes at least four separate longitudinal sections, each of said sections being generally uniformly configured and being nestable one within the other in compactly stacked relationship when disassembled.

5. The expendable fuel tank of claim 2 including first retention means carried by said bladder and second retention means carried by said sections of said housing, said first and second retention means being engageable with respect to one another so as to anchor said bladder within said housing.

6. The expendable fuel tank of claim 5 in which said first and second retention means are interengageable fabric fasteners.

7. The expendable fuel tank of claim 2 in which said opposite edges of sections of said housing include a plurality of spaced hinge joint means, each of said hinge joint means defining an opening therethrough, said second connector means for joining said opposite edges of said sections including elongated rod means extending through said openings in said hinge joint means.

8. The expendable fuel tank of claim 1 in which said strongback means includes upper and lower surfaces, a plurality of mounting means disposed along said upper surface thereof, said mounting means being adaptable to connect said strongback means to the aircraft, and ejection means carried by said strongback means for jetisoning said housing and said bladder means from said strongback means.

9. The expendable fuel tank of claim 1 in which said fuel dispensing means includes a fuel discharge outlet extending from said bladder, a fuel discharge line extending inwardly of said bladder and having an upper end connected to said discharge outlet by means of a flexible joint and a lower end spaced from said lower portion of said bladder, said discharge line being movable in a pendulum motion by gravity within said bladder.

10. The expendable fuel tank of claim 9 in which said fuel dispensing means further includes a fuel gauge means suspended within said bladder and generaly parallel to said fuel discharge line, said fuel gauge means including an elongated tubular portion which is suspended from a flexible connector to a support extending outwardly of said bladder and a float means oriented within said tubular portion which is electrically connected so as to reflect the level of fuel within the bladder to a remote point.

11. The expendable fuel tank of claim 1 in which said fuel dispensing means includes a pressure inlet means, a float valve operative to close said pressure inlet means in response to a high level of fluid within said bladder, and pressure relief valve means disposed through said bladder so as to prevent the buildup of pressure within said bladder.

12. An expendable fuel tank for mounting to the pylon of an aircraft comprising, a housing having separate longitudinal sections, each of said sections having forward and aft ends, generally convex outer surfaces and generally concave inner surfaces and opposite edges, a generally flexible fuel retaining bladder cooperatively received between said sections of said housing, said bladder having upper and lower portions and being substantially impervious to fluid but having an opening through an upper portion thereof, strongback means, first connector means extending through said housing for connecting said housing to said strongback means, a first opening in said housing which is in alignment with said opening in said bladder, fuel dispensing means disposed within said bladder and mounted within said opening therein, second connector means for joining said opposite edges of said sections of said housing in substantially abutting relationship with respect to one another, a plurality of baffle members positioned between said housing sections and having opposite end portions for engaging said generally concave inner surfaces of said sections, means for supporting said baffle members relative to said sections of said housing, said opposite edges of said section of said housing include a plurality of spaced hinge joint means, each of said hinge joint means defining an opening therethrough, said second connector means for joining said opposite edges of said sections including at least one elongated rod means extending through aligned openings in said hinge joint means, said opposite edges of said sections also including inner and outer elongated flanges separated by an elongated groove, said hinge joint means being integrally formed with said inner flange so as to extend outwardly with respect to said groove and said outer flange so that said elongated rod means extends through said openings in said hinge joint means and below said outer flange, and fairing strip means receivable within said elongated groove so as to overly said hinge joint means and said connecting rod means when said sections are connected with respect to one another.

13. The expendable fuel tank of claim 12 in which said housing includes at least four separate longitudinal sections, each of said sections being generally uniformly configured so as to be nestable one within the other in compactly stacked relationship when disassembled.

14. An expendable fuel tank for mounting to the pylon of an aircraft comprising, a housing having separate longitudinal sections, each of said sections having forward and aft ends, generally convex outer surfaces and generally concave inner surfaces and opposite edges, a generally flexible fuel retaining bladder cooperatively received between said sections of said housing, said bladder having upper and lower portions and being substantially impervious to fluid but having an opening through an upper portion thereof, strongback means, first connector means extending through said housing for connecting said housing to said strongback means, a first opening in said housing which is in alignment with said opening in said bladder, fuel dispensing means disposed within said bladder and mounted within said opening therein, second connector means for joining said opposite edges of said sections of said housing in substantially abutting relationship with respect to one another, a plurality of baffle members positioned between said housing sections and having opposite end portions for engaging said generally concave inner surfaces of said sections, means for supporting said baffle members relative to said sections of said housing said strongback means having upper and lower surfaces, a plurality of mounting means disposed along said upper surface thereof, said mounting means being adaptable to connect said strongback means to the aircraft, and ejection means carried by said strongback means for jetisoning said housing and said bladder from said strongback means, a brace plate means disposed between said bladder and said sections of said housing, an opening in said brace plate means which is in alignment with said first opening in said housing and said opening in said bladder, and a plurality of openings in said brace plate means through which said first connector means for connecting said housing to said strongback means extend.

15. The expendable fuel tank of claim 14 in which said first connector means for connecting said housing to said strongback means includes a plurality of pin means, each of said pin means having an enlarged head portion and a shank portion, an outwardly extending key element carried by said shank portion of said pin means, said strongback means having a plurality of pin retaining assemblies mounted therein, said pin retaining assemblies including support means for engaging said pin means so as to prevent said key element of said pin means from passing therefrom thereby securing said pin means to said strongback means, and means for selectively adjusting said support means so as to permit said key element of said pin means to pass therethrough so as to allow said pin means to be disconnected from said strongback means.

16. The expendable fuel tank of claim 15 in which said ejection means of said strongback means includes a pair of control rod means disposed in spaced relationship along said strongback means, each of said control rod means being drivingly connected to said support means for supporting said pin means, and means for supplying pressurized fluid to said control rod means so as to activate said control rod means to cause said support means to be adjusted to release said pin means from said strongback.

17. The expendable fuel tank of claim 16 in which said ejection means further includes an injection piston means mounted in said strongback means, said piston means having plate means being selectively engageable with said housing of the fuel tank, said piston means being activated to urge said housing away from said strongback means in response to fluid pressures supplied to said piston means.

18. The expendable fuel tank of claim 17 in which said piston means and said control rod means are connected to a common source of high pressure fluid supply whereby said piston means and said control rod means are activated substantially simultaneously to release said pin means and to activate said piston means.

19. An expendable fuel tank for mounting to the pylon of an aircraft comprising a housing having at least four longitudinally extending sections, each of said sections having forward and aft ends, each of said sections being generally similarly shaped so as to be nestable one within the other and having generally convex outer surfaces and generally concave inner surfaces and opposite edges, each of said edges of said sections including hinge joint means, elongated rod means for selectively joining the opposing hinge joint means carried by the opposing edges of adjacent housing sections so that said sections are connected continuously along said edges, a flexible fuel retaining bladder cooperatively received between said sections of said housing, said bladder having upper and lower portions and being substantially impervious to fluid but having an opening through a portion thereof, a fuel dispensing means disposed through the opening in said bladder and being secured in fluid tight relationship therewith, a brace plate means mounted within said housing, said brace plate means having a plurality of first openings therein, a plurality of second openings disposed through two of said housing sections, said second openings being in general alignment with said first openings in said brace plate means, a strongback means, pin means extending through said first openings in said brace plate means and said second openings in said two housing sections and receivable within said strongback means, said strongback means having means for selectively securing said pin means within said strongback means and having ejection means for releasing said pin means therefrom so as to allow the ejection of said housing from said strongback means.

20. The expendable fuel tank of claim 19 including a plurality of baffle members positioned between said housing sections having opposite end portions for engaging said generally concave inner surfaces of said sections of said housing, said bladder having a plurality of generally parallel recessed portions formed therein and extending from the upper toward the lower surface thereof, said baffle members being positioned within said recesses in said bladder means, and means for securing said bladder to said sections of said housing.

* * * * *